United States Patent [19]

Miller

[11] Patent Number: 5,074,138

[45] Date of Patent: Dec. 24, 1991

[54] METHOD OF MAKING BELLOWS PIPE

[76] Inventor: Robert F. Miller, 3368 Las Huertas Rd., Lafayette, Calif. 94549

[21] Appl. No.: 639,123

[22] Filed: Jan. 9, 1991

[51] Int. Cl.⁵ .................... B21C 37/12; F16L 11/00
[52] U.S. Cl. .................................... 72/49; 138/135; 29/509
[58] Field of Search ............... 72/49, 50, 135, 368; 138/134, 135, 122, 153, 124, 173; 29/505, 509

[56] References Cited

U.S. PATENT DOCUMENTS

| | | | |
|---|---|---|---|
| 3,566,643 | 3/1971 | Westerbarkey | 72/49 |
| 3,815,639 | 6/1974 | Westerbarkey | 138/122 |
| 4,377,188 | 3/1983 | Siegwart | 138/122 |
| 4,481,978 | 11/1984 | Escandell | 138/122 |

FOREIGN PATENT DOCUMENTS 0104842  4/1984  European Pat. Off. ............... 72/50

Primary Examiner—Lowell A. Larson
Assistant Examiner—Michael J. McKeon
Attorney, Agent, or Firm—Ernest M. Anderson

[57] ABSTRACT

A bellows pipe construction and method for manufacturing are disclosed wherein helically wound coils of logitudinally corrugated strip are joined with an interlocking seam. Thereafter, the interlocking seam is deformed to position the edges of the strip in substantial parallelism with the axis of the pipe. The resulting pipe can be extended or shortened for installation and will further adjust and accommodate ground movement without substantial loss of strength.

8 Claims, 1 Drawing Sheet

METHOD OF MAKING BELLOWS PIPE

SUMMARY OF THE INVENTION

This invention relates generally to the manufacture and construction of a bellows pipe made from metallic strip material for use as underground conduit. A bellows type construction allows axial expansion and contraction and may be laid along a tortuous ditch or pathway. Such pipe also is capable of accommodating ground movements as occur during earthquakes, which result in bending and axial expansion and contraction. Although bellows pipe constructions are known in the art, there are no known underground applications of such pipe made from helically formed and seamed metallic strip material. The primary problem which may be encountered in using such pipe is that the helical strip from which the pipe is made may be become unseamed as a result of repeated or excessive axial expansions and contractions.

In brief, the invention described herein provides a novel construction for forming a bellows pipe with metallic strip material wherein after seaming the strip at an angle of approximately 20° or greater relative to the pipe's axis the seam is then deformed to position the seam and the interlocking edges of the strip parallel to the pipe axis. The resulting pipe construction exhibits substantially greater strength characteristics and resistance to unseaming than previously known helically formed and seamed pipe.

BRIEF DESCRIPTION OF THE DRAWINGS

In the drawings forming a part of this application.

DETAILED DESCRIPTION OF THE INVENTION

Figure 1:
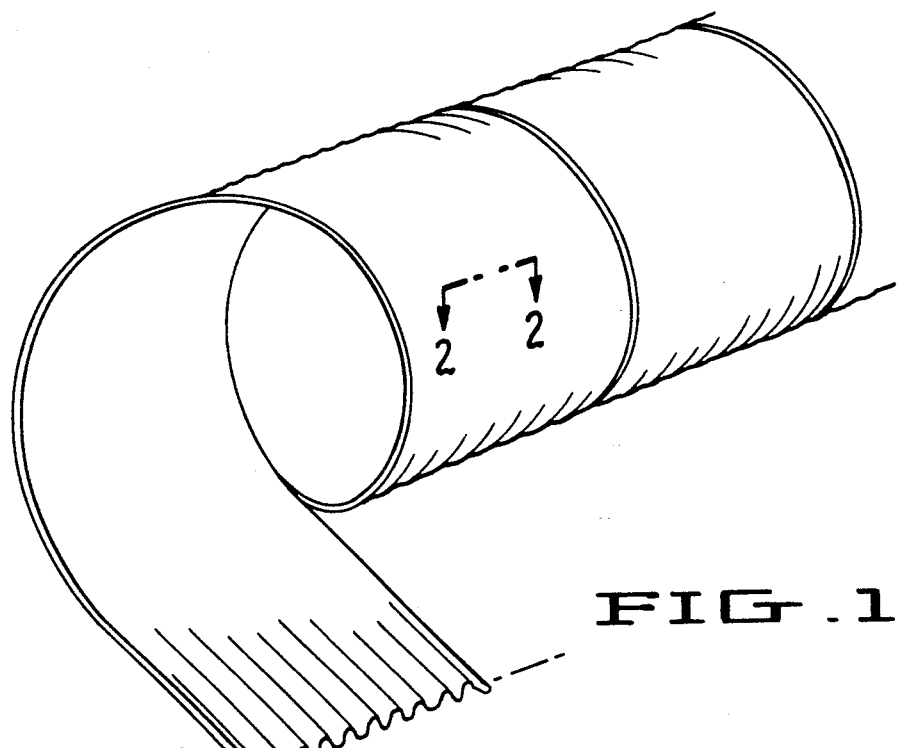
FIG. 1 is a perspective view of a preferred embodiment of the invention in a bellows pipe made from metallic strip material.

The preferred embodiment of the invention shown in FIG. 1 illustrates a bellows type pipe from metallic strip. In the conventional manner planar or flat strip is longitudinally corrugated to form a strip having a substantially sinusoidal cross section defined by alternating ridges 10 and grooves 11. Ridges 10 extend from grooves 11 and cross the neutral plane of the strip (indicated by broken line 12) at an angle $\phi$ preferable greater than 60°. This provides sufficient material in the strip and resulting pipe to permit both expansion and contraction after the pipe is formed.

Figure 2:
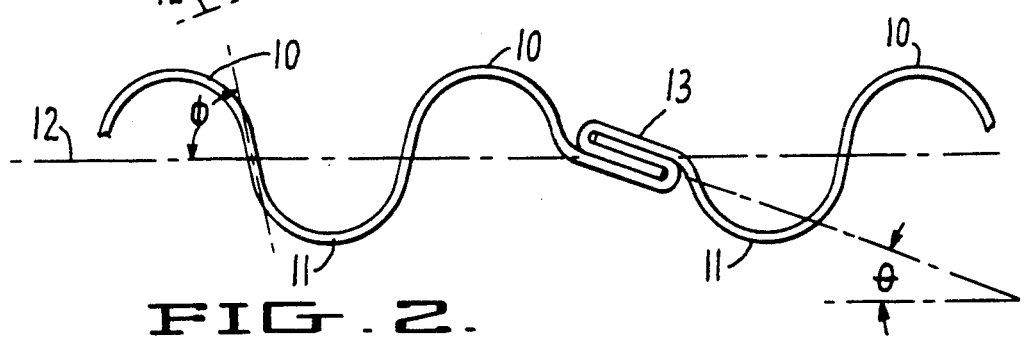
FIG. 2 is an enlarged longitudinal section taken through one wall and seam of the pipe as initially formed.

In the preferred embodiment the pipe utilizes a conventional interlocking seam 13 as shown in U.S. Pat. No. 3,247,692. Accordingly, prior to coiling the strip material the edges are prepared or formed for producing an interlocking seam. Thereafter, the strip material is helically coiled and the opposite edges of the coiled strip are engaged in an interlocking seam, as shown in FIG. 2. This results in a bellows pipe construction which, although satisfactory for many purposes, does not possess sufficient strength in the seam to withstand severe and repeated axial expansions and contractions. It has been found, however, that by deforming the interlocking seam and positioning the edges in substantial parallelism with the axis of the pipe increased strength is obtained to resist unseaming. Two such pipe structures are shown in FIG. 3 and 4.

The initial step of interlocking the edges, as shown in FIG. 2, is preferable carried out by engaging the edges radially intermediate the exterior surfaces of the ridges and grooves at an angle $\theta$ of approximately 20° or greater relative to the axis of the pipe. If formed at a lesser angle, difficulty will be experienced in engaging the edges using conventional roller dies.

A preferred method of manufacture employs a process where the pipe corrugations are formed with a helix angle of 75° or greater relative to the pipe axis. This allows for exceptional expansion and contraction of the pipe. Also, a preferred corrugation of the strip is one that is substantially sinusoidal in cross section as defined by the alternating ridges 10 and grooves 11. As shown in FIGS. 2 and 3 the ridges extend from grooves 11 and cross the neutral plain 12 of the strip at an angle greater than 60°. This contributes to the structural characteristics of the pipe and its ability to expand and contract from the "as manufactured" condition.

Figure 3:
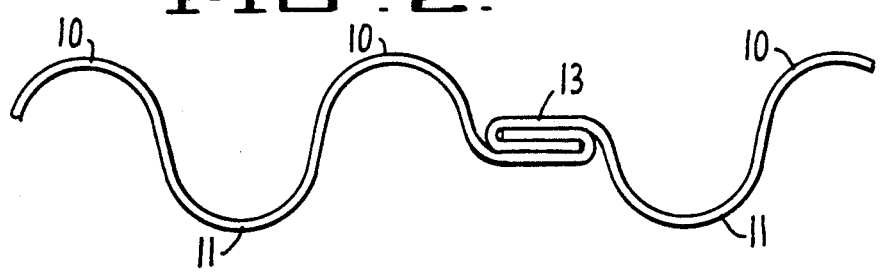
FIG. 3 is a longitudinal section taken through the same wall and seam after deforming the seam to position it and the edges of strip in a neutral plain substantially parallel to the axis of the pipe.
Figure 4:
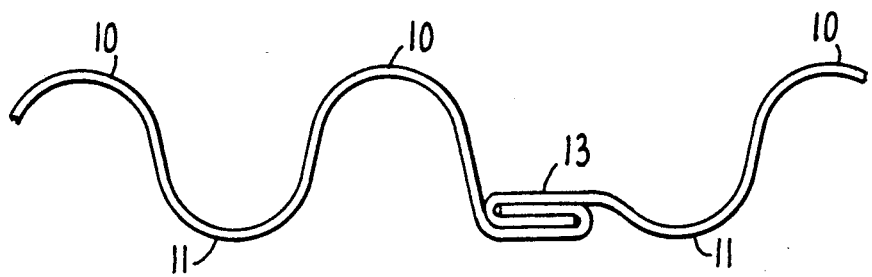
FIG. 4 is a longitudinal section through one wall and seam at a pipe that is deformed inwardly to a position in line with the innermost corrugated surfaces.

As shown in FIG. 3, the interlocking seam is deformed to a radial position relative to the pipe axis such that the strip edges are maintained radially intermediate the exterior surfaces of the ridges and grooves. This is a preferred construction where strength is of paramount importance. However, for some applications it may be desirable to deform the seam to a position that is the same radial distance from the pipe axis as are grooves 11, as shown in FIG. 4. This construction provides a more uniform flow surface within the pipe to reduce turbulence across the lock seam. This will be of substantial importance where used in combination with a cylindrical liner having substantially the same internal diameter as the lock seam.

The spacing of corrugations as well as their size and depth are important to the overall strength of the pipe and its ability to expand and contract. Quality pipe constructions have been formed with a modulus spacing between ridges and grooves of approximately $\frac{1}{2}$ inch and a depth spacing of between $\frac{1}{4}$ inch and $\frac{1}{2}$ inch. The preferred size of corrugations is one that is semicircular and formed with a radius of curvature less than $\frac{1}{4}$ inch.

Although preferred embodiments of the invention have been illustrated and described, various modifications and changes may be resorted to without departing from the spirit of the invention or the scope of the appended claims, and each of such modifications and changes is contemplated.

What is claimed is:

1. A method for making expandable-contractible metal pipe from strip material, comprising:
    longitudinally corrugating metallic strip material to form a corrugated strip having a substantially sinusoidal cross section defined by alternating ridges and grooves formed to opposite sides of a neutral plane intermediate the ridges and grooves, said ridges extending from grooves and crossing the neutral plane of the corrugated strip at an angle greater than 60°;

forming the edges of the strip material for joining them together in an interlocking seam;

helically coiling the corrugated strip while simultaneously engaging opposite edges of the strip in an interlocking seam, said edges being in abutting engagement and extending at an angle of approximately 20° or greater relative to the axis of the pipe; and then deforming the interlocking seam to position the edges of the strip in substantial parallelism with the axis of the pipe.

2. The method of claim 1, said pipe being helically coiled with a helix angle of 75° or greater relative to the pipe axis.

3. The method of claim 1, said ridges and grooves being symmetrical and substantially arcuate.

4. The method of claim 1, said corrugated strip having ridges and grooves that are symmetrical and substantially arcuate, adjacent ridges and grooves extending from the neutral plane therebetween on a tangent plane that crosses the neutral plane of the corrugated strip.

5. The method of claim 1, the interlocking seam being deformed to radially position the strip edges radially intermediate the exterior surfaces of the ridges and grooves.

6. The method of claim 1, said ridges and grooves being formed on a modulus spacing of approximately ½ inch.

7. The method of claim 1, the depth of the corrugated strip from a ridge surface to a groove surface being approximately ¼ inch to ½ inch.

8. The method of claim 1, said corrugated strip being formed with semi-circular ridge surfaces and groove surfaces, the radius of curvature being less than ¼ inch.

* * * * *